(12) United States Patent
Banker et al.

(10) Patent No.: US 7,668,046 B2
(45) Date of Patent: Feb. 23, 2010

(54) APPARATUS AND METHOD FOR DETERMINING THE POSITION OF AN OBJECT IN 3-DIMENSIONAL SPACE

(76) Inventors: Christian Banker, c/o Worcester Polytechnic Institute, 100 Institute Rd., Worcester, MA (US) 01609; Michael Cretella, c/o Worcester Polytechnic Institute, 100 Institute Rd., Worcester, MA (US) 01609; Jeff Dimaria, c/o Worcester Polytechnic Institute, 100 Institute Rd., Worcester, MA (US) 01609; Jamie Mitchell, c/o Worcester Polytechnic Institute, 100 Institute Rd., Worcester, MA (US) 01609; Jeff Tucker, c/o Worcester Polytechnic Institute, 100 Institute Rd., Worcester, MA (US) 01609; Brian King, c/o Worcester Polytechnic Institute, 100 Institute Rd., Worcester, MA (US) 01609

(*) Notice: Subject to any disclaimer, the term of this patent is extended or adjusted under 35 U.S.C. 154(b) by 0 days.

(21) Appl. No.: 12/134,729

(22) Filed: Jun. 6, 2008

(65) Prior Publication Data

US 2009/0027271 A1    Jan. 29, 2009

Related U.S. Application Data

(60) Provisional application No. 60/942,316, filed on Jun. 6, 2007.

(51) Int. Cl.
   *G01S 3/80*   (2006.01)

(52) U.S. Cl. .................. 367/127; 367/129; 367/907
(58) Field of Classification Search ............... 367/124, 367/126, 127, 129, 907
See application file for complete search history.

(56) References Cited

U.S. PATENT DOCUMENTS

| 4,592,034 | A | * | 5/1986 | Sachse et al. ............... 367/127 |
| 4,654,648 | A | | 3/1987 | Herrington et al. |
| 4,862,152 | A | | 8/1989 | Milner |
| 5,144,594 | A | | 9/1992 | Gilchrist |
| 5,637,839 | A | * | 6/1997 | Yamaguchi et al. ......... 367/907 |
| 7,145,549 | B1 | | 12/2006 | Sun |
| 7,158,126 | B2 | | 1/2007 | Trajkovic et al. |

FOREIGN PATENT DOCUMENTS

WO    02058002 A1    7/2002

* cited by examiner

*Primary Examiner*—Ian J Lobo
(74) *Attorney, Agent, or Firm*—Burns & Levinson LLP; Jacob N. Erlich; Orlando Lopez (57) ABSTRACT

An apparatus and method is disclosed for determining the position of a user interface mouse using time of arrival measurements. A transmitter transmits a signal to an array of receivers that are spatially separated from one another. The time difference of arrival for is found for each receiver relative to a predetermined reference receiver. Using the time difference of arrival (TDOA) of each receiver, the location in 3-dimensional space of each receiver, and the speed of sound the position of the transmitter in 3-dimensional space relative to the reference receiver may be found.

43 Claims, 11 Drawing Sheets

APPARATUS AND METHOD FOR DETERMINING THE POSITION OF AN OBJECT IN 3-DIMENSIONAL SPACE

CROSS REFERENCE TO RELATED APPLICATIONS

This application claims priority to a U.S. provisional application Ser. No. 60/942,316 entitled ULTRASONIC 3D WIRELESS COMPUTER MOUSE, filed on Jun. 6, 2007, which is incorporated by reference in its entirety herein

BACKGROUND OF THE INVENTION

This invention relates generally to interfacing a user mouse interface to a computer and without limitation thereto determining the position of the computer mouse interface in 3-dimensions and providing the 3-dimensional position in real time to the computer.

Computer interfaces are one of the three major divisions within computer theory and design: input, processing and output. The goal of a computer interface is to balance the relationship between instinctive interaction and device functionality.

A computer mouse as a user interface to a computer was developed in the 1960s at the Stanford Research Institute as a token that could be moved about a surface and that was able to translate movement data to the computer. Although significant development has occurred, the mouse is still used primarily as a 2-dimensional interface. The standard mouse is ill suited for 3D software and even the development of a scroll wheel to traverse a third-dimension does not allow for simultaneous movement in three dimensions nor does it provide high resolution along the z-axis.

Accordingly, it would be advantageous to provide a new computer mouse interface that allowed for movement in three dimensions and also provides for high resolution along the z-axis.

SUMMARY OF THE INVENTION

An apparatus and method is disclosed for determining the position of a user interface mouse using time of arrival measurements. As an exemplary embodiment but not limited thereto, a transmitter transmits a signal to an array of receivers that are spatially separated from one another. The time of arrival at each receiver is determined and the difference in time of arrival for each receiver relative to a predetermined reference receiver is then determined. Using the time difference of arrival (TDOA) of each receiver, the location in 3-dimensional space of each receiver, the speed of sound, and the position of the transmitter in 3-dimensional space relative to the reference receiver may be found.

Other features, aspects, and advantages of the above-described method and system will be apparent from the detailed description of the invention that follows.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

FIG. 9A is a graphic comparison of a received signal and a stored representation of a received signal;

FIG. 9B is a graphic comparison of a received signal after normalization and a stored representation of a received signal.

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

The apparatus and method described herein are for transmitting a signal, which may be from a user interface, to a plurality of receivers each of which receives and conditions the signal and the provides the plurality of signals to a digital signal processor (DSP) that processes the signals received by the plurality of receivers to determine the time of arrival (TOA) of the signal at each receiver. The time difference of arrival for each receiver relative to a reference receiver is determined and the position in 3-dimensional space of the transmitter is determined in real time and this position data is provided to a computer or other electronic device.

Figure 1:
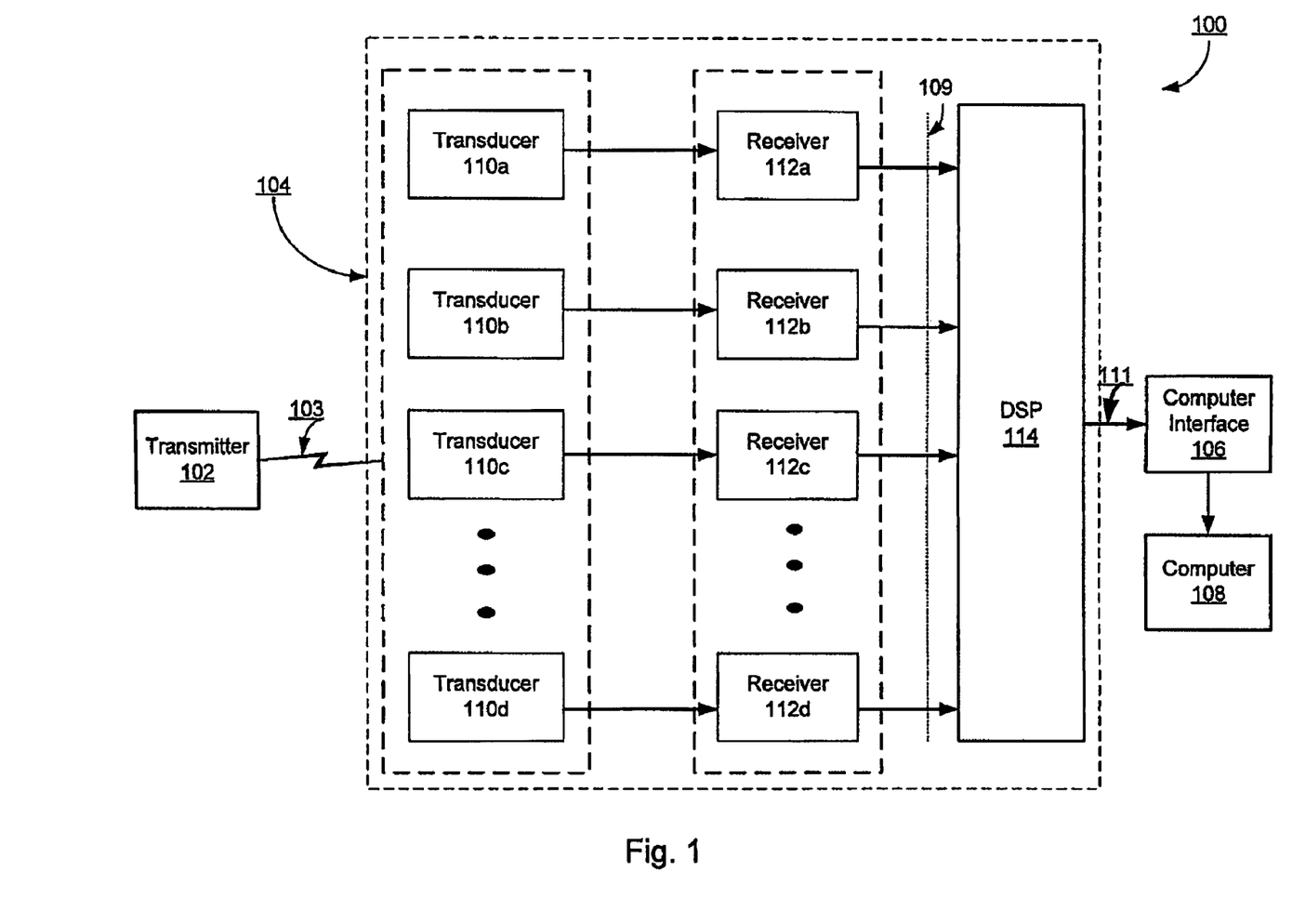
FIG. 1 is a block diagram of the apparatus described herein.

FIG. 1 depicts a block diagram of the apparatus described herein that is used to provide a 3-dimensional user interface to a computer. In particular, the system 100 includes a transmitter 102 and a receiver 104, a computer interface 106, and a computer 108. The transmitter 102 is designed to provide a wireless signal 103 to the receiver 104 that can be processed and analyzed to determine the spatial position of the transmitter in 3-dimension space relative to a predetermined origin. The receiver 104 includes a transducer array that includes a plurality of transducers, 110*a*-110*d* spatially separated from one another in 3-dimensions and each having a specific 3-dimensional set of coordinates relative to a predetermined origin, wherein one of the plurality of transducers 110*a*-*d* is determined to be a reference transducer, which may be collocated with the predetermined origin. The receiver 104 also includes, a plurality of signal receivers 112*a*-112*d*, one for each transducer in the transducer array. As will be explained in more detail below, the signal receiver that corresponds to the reference transducer is selected as a reference receiver.

The receiver 104 further includes a digital signal processor (DSP) 114 that converts signals into a digital format and provides for the calculations for the time of arrival (TOA) of the wireless signal 103 at each of the plurality of transducers 110a-110b, for the time difference of arrival (TDOA), which is the difference in arrival time of the signal 103 for each of the plurality of transducers 110a-110d relative to the reference transducer, and for the determination of the set of 3-dimensional coordinates of position of the transmitter relative to the predetermined origin location. The DSP 114 receives the plurality of output signals 109 from the plurality of signal receivers 112a-112d and uses the plurality of received signals 109 to determine the 3-dimensional position 111 of the transmitter as a function of the 3-dimensional locations of each of the transducers 110a-110d relative to the predetermined origin, and the time difference of arrival data of the signal 103 for each of the plurality of transducers 110a-110d relative to the reference transducer. The three-dimensional position 111 is then provided to the computer interface 106 and then to a computer 108. In one embodiment the system 100, may make use of the transmitter 102 as a user interface for a computer and the system in sensing the position of the transmitter 102 may provide the 3-dimensional location of the transmitter 102 to the computer 108. In this embodiment the transmitter 102 is equivalent to a 3-dimensional computer mouse. In another embodiment, the 3-Dimensional position data may be used to track the motion of desired objects The transmitter may transmit any suitable signal 103, e.g., radio frequency, microwave, sonic or ultrasonic energy may be used. As will be discussed in more detail below, time difference of arrival data is calculated and analyzed to find the transmitter position in 3-dimensional space. Different types of signals, e.g., electromagnetic or sound waves may be used depending upon the scale of the system involved. For example, to achieve a given spatial accuracy, the following equation is used:

$$\Delta t = \frac{2\Delta d}{c}$$

Where c is the propagation speed of the signal and d is the desired resolution. For a 1 mm spatial accuracy in a single dimension an electromagnetic signal would have a Δt of 6.67 ps, while a sonic signal would have a Δt of 5.58 μs. This represents a six order of magnitude difference between using an electromagnetic such as an optical or radio signal versus an acoustic signal such as a sonic or ultrasonic signal. Due to processing requirements and the distances involved being fairly small, on the order of 1 or 2 meters, in the preferred embodiment, ultrasonic signals will be used. However, in other systems, and depending upon the system requirements, it may be advantageous to use electromagnetic signals instead.

Figure 2:
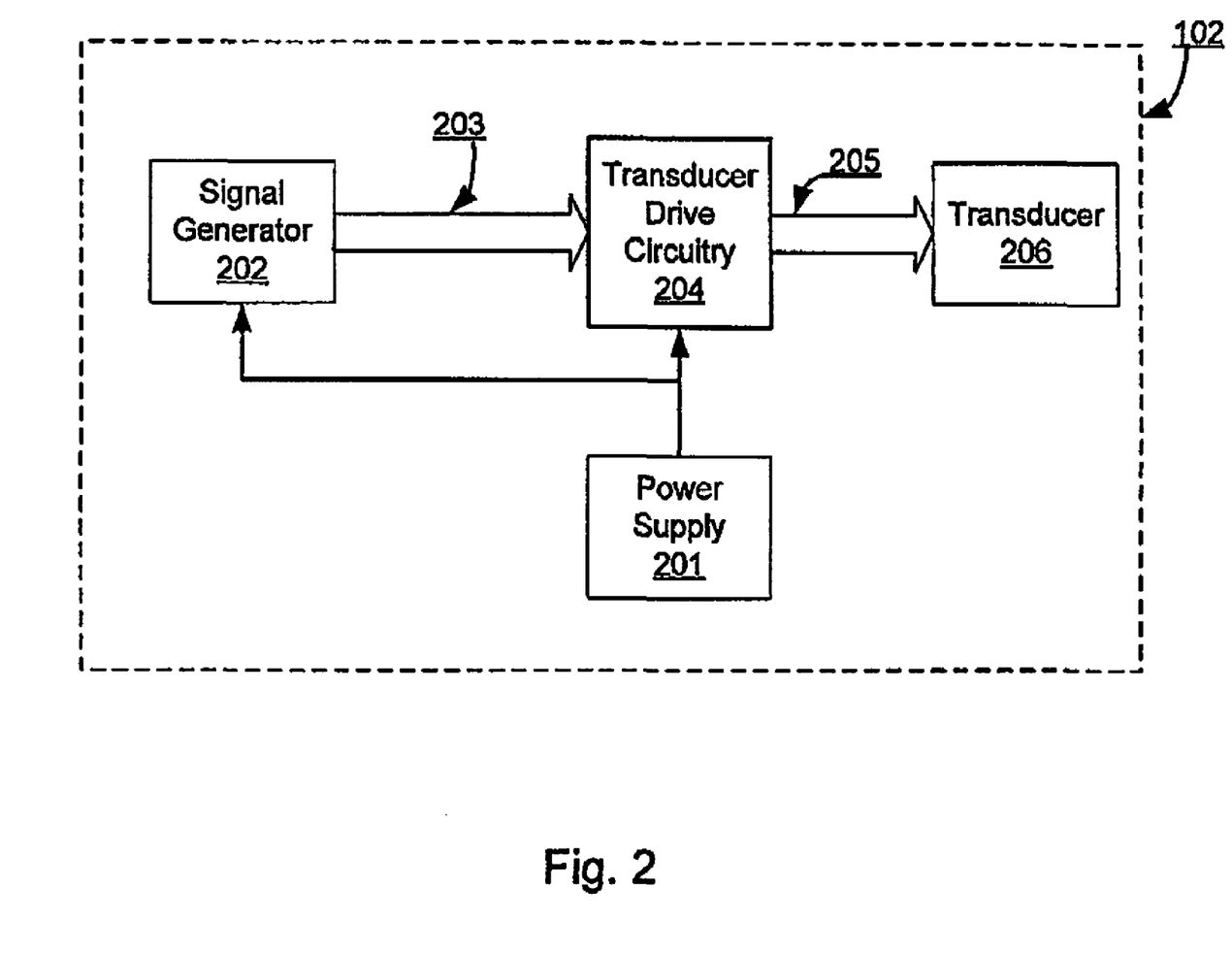
FIG. 2 is a block diagram of the transmitter provided for in FIG. 1.

FIG. 2 depicts an embodiment of the transmitter 102 provided for in FIG. 1. In particular, the transmitter 102 includes a signal generator 202 that provides a signal 203 having predetermined waveform, at a predetermined frequency, and using a predetermined pulse repetition rate to a transducer drive circuitry 204. The transducer drive circuitry 204 amplifies the signal 203 and provides this amplified signal 205 to the ultrasonic transducer 206 that generates ultrasonic signal 103 as shown in FIG. 1. A power supply 201, described in more detail below provides power to the transmitter components. The actual circuit design of the transducer drive circuitry would be well known in the electrical art. The actual circuit would be dependent upon the type of transducer used, the power required, the type of waveform being generated, environmental conditions, and other system requirements.

The transmitter is preferably a small lightweight and unobtrusive device. To this end, the ultrasonic transducer 206 should be small and not cumbersome. Ultrasonic transducers can transmit nearly any frequency over 20 KHz, but the ultrasonic transducer used herein is preferably a 40 KHz transducer. In addition, ultrasonic transducers may be open or closed, i.e., open transducers have the piezo-electric device and cone exposed to air, while a closed transducer has the piezo-electric device mounted on the outer case. In the apparatus described herein, an open transducer is preferred; however, an enclosed transducer may also be used in harsh environments, or if other system requirements militate for an enclosed transducer.

The transducer 206 may be omni-directional in transmitting a signal or may be directional. The disclosed apparatus preferably uses an ultrasonic transducer 206 that is directional and does not attenuate the transmitted signal significantly in the 30° to 45° range. The ultrasonic transducer may also have varying bandwidth; however, because the apparatus described herein uses an ultrasonic transducer using a center frequency of substantially 40 KHz the bandwidth is not a large concern, except in how the transducer may act as a bandpass filter on a transmitted or received signal. In addition, the ultrasonic transducer 206 may be of varying sizes; however, a smaller transducer is preferred, provided that it meets other system requirements as well. In one embodiment of the apparatus described herein, a Kobtrone transducer having a transmitter and receiver part numbers, respectively, of 255-400ST12 and 255-400SR12 were used and are available from a distributor such as Mouser Electronics, a TTI company at Mouser Electronics, Inc. 1000 North Main Street Mansfield, Tex. 76063 at (800) 346-6873.

The signal generator 202 may be either an analog or digital signal generator depending upon the system requirements For example, crystal oscillators, phase locked loops, integrated timing circuits, or digital oscillators may be used. However, in the apparatus described herein a digital signal processing system or programmable controller is preferred. This allows for a low power, flexible design that uses fewer components than the analog methods described above.

Figure 3:
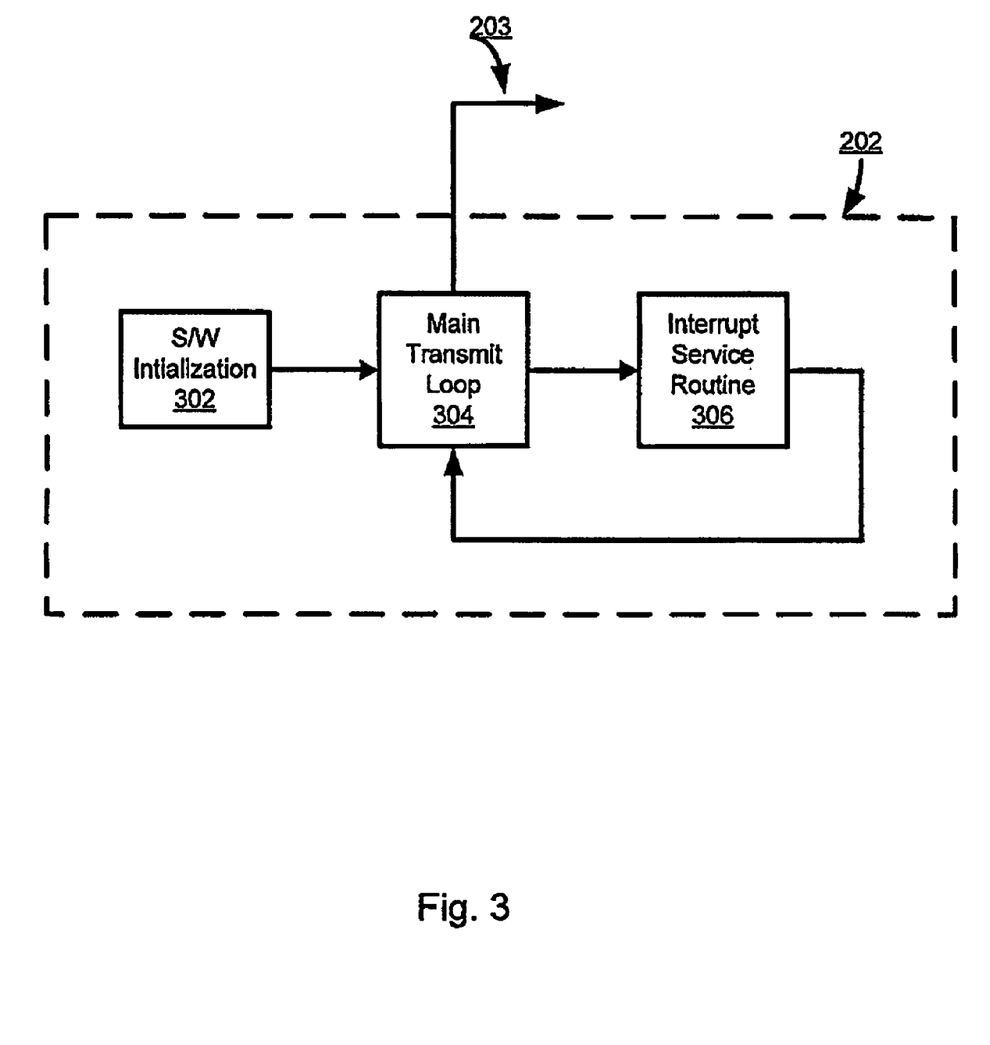
FIG. 3 is a firmware representation of a programmable controller used in the transmitter provided for in FIG. 1.

FIG. 3 depicts a block diagram of a firmware implementation suitable for use on a programmable controller or digital signal processor. The s/w initialization block 302 sets the outputs and other functions as required. The main transmit loop 304 forms the signal 203 that is provided to the transducer amplifier 204 shown in FIG. 2 and that is eventually provided to the transducer 206 to transmit signal 103. An interrupt service routine 306 is used to bring the microcontroller or digital signal processor out of a low power that may be entered between pulses. The selection of a particular programmable controller/digital signal processor is based on several parameters. The device should be low power, come in a physically small package, have a low pin count, an external crystal connection for a 40 KHz crystal, and have at least one available digital Input/Output line. In one embodiment, the programmable controller/digital signal processor may be a Texas Instrument MSP430F20xx available from Texas Instruments.

The flexibility afforded by using a programmable controller allows for data to be encoded and transmitted within the signal used to provide the Time Delay of Arrival (TDOA) measurements. Using sonic signals, such as ultrasonic, phase of the transmitted signals would be changing with the position of the transmitter so that on-off-keying (OOK) is a preferred choice for data transmission using an ultrasonic transducer.

For example, clicking of right or left buttons or using a track wheel could be encoded and transmitted using OOK signals. In the event that optical or radio signals could make use of frequency-shift keying (FSK) or phase shift keying (PSK) such as QPSK or BPSK could also be used.

In another embodiment, more than one transmitter may be used at a time and the signals differentiated using encoded data that corresponds to a particular transmitter. In the event that more than one transmitter is used, transmitters could also be differentiated by differences in frequencies that are transmitted or other forms of multiplexing may be used as well.

In one embodiment of the present apparatus, the signal is comprised of a series of square wave pulses wherein each square wave pulse is 20 cycles of the 40 KHz signal and each series of pulses would have a pulse rate of 100 Hz. This translates to a pause of 380 cycles of 40 KHz signal between each pulse. Other pulse widths and pulse rates may be used depending upon the system requirements.

In the event that a Texas Instrument MSP430F20xx is used, the devices auxiliary clock (ACLK) is set to run off an external 40 KHz crystal, the capture/compare register (CCR) is used to count up to a specified value at the rate of one per ACLK cycle and then trigger an interrupt. The firmware depicted in FIG. 3 sends a signal by the following steps: (1) Set port 1.0 to output ACLK (auxiliary clock); enter low power mode (LPM3); Set CCR to count 20 ACLK cycles then interrupt to come out of low power mode; Turn off ACLK output on Port 1.0 then enter low power mode; set CCR to count 380 ACLK cycles then interrupt; repeat from (1).

Figure 4:
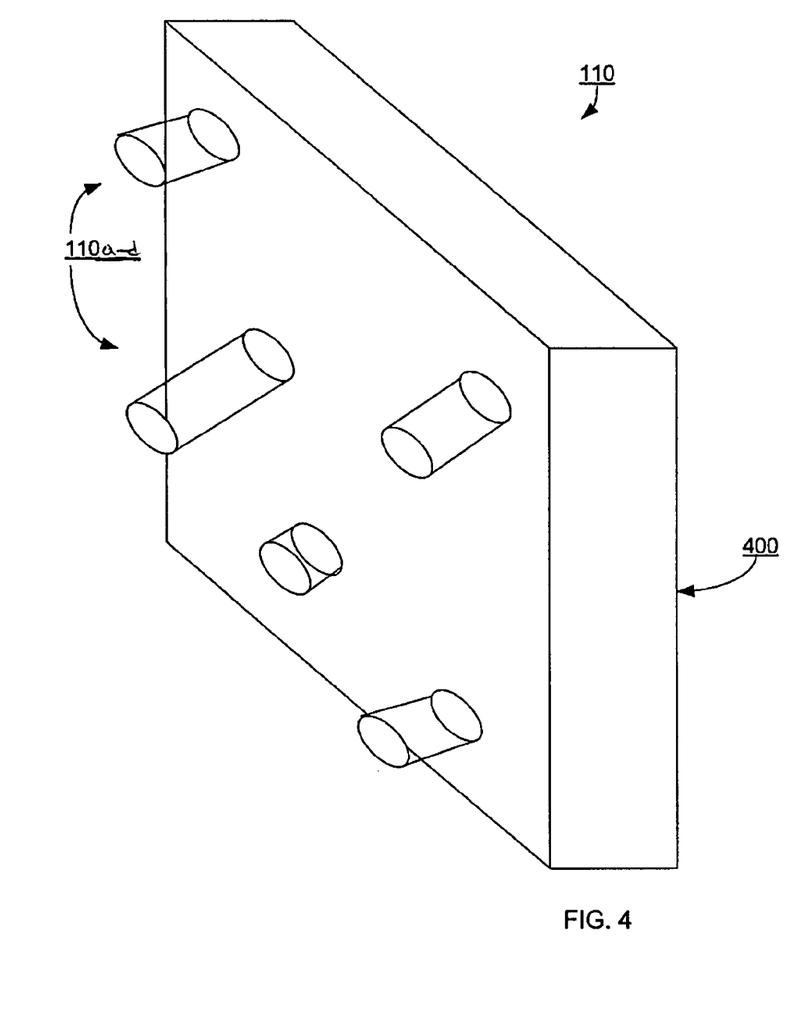
FIG. 4 is a pictorial representation of the receiver array provided for in FIG. 1.

FIG. 4 depicts an embodiment of a transducer array for use in the apparatus described herein for receiving the signal 103 provided by the transmitter 102 and converting the signal 103 into an electrical signal that is suitable for further processing. In particular, the receiver array includes a plurality of ultrasonic transducers 110a-d that are spatially separated from one another and attached to a frame 400. The ultrasonic transducers, discussed above, act as bandpass filters having a center frequency of 40 KHz. The actual spatial distribution of the transducer array is in 3-dimensions and is a function of the system requirements. Each transducer 110a-d is spaced apart, in all 3-dimensions, both from the designated reference transducer as well as from other transducers in the transducer array. In addition, although five transducers 110a-d are depicted in the figure, any number greater than or equal to four may be used, with a correlation between accuracy and the number of receivers used in the array.

Figure 5:
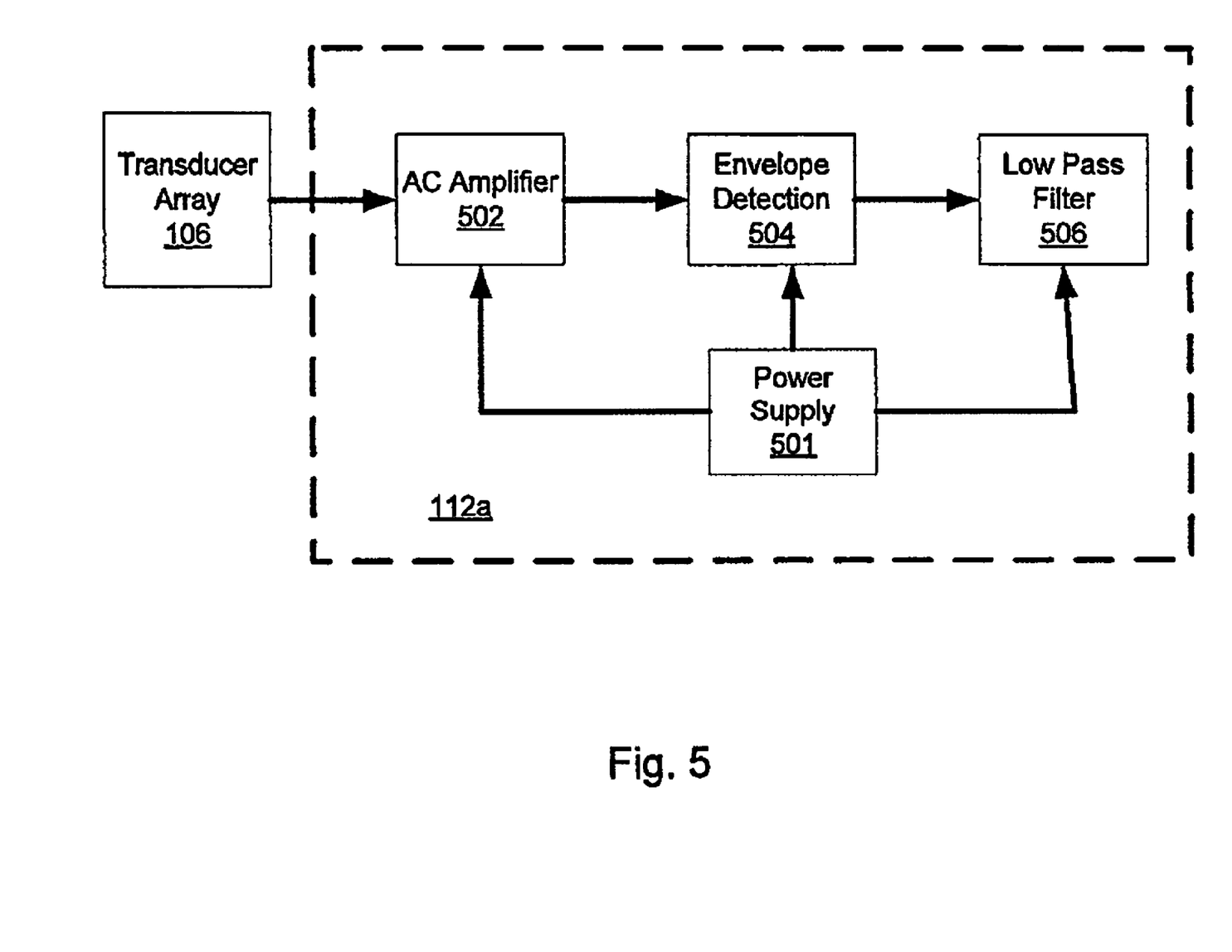
FIG. 5 is a block diagram of the receiver block provided in FIG. 1.

FIG. 5 depicts a block diagram of a representative signal receiver 112a of the plurality of receivers 112a-d, shown in FIG. 1, suitable for use in receiver 104 in the apparatus described herein. Each of the signal receivers 112a-d is configured to amplify and convert the electrical signal received from a corresponding transducer 110a-d into a format that preserves the pulse peak time of the electrical signal and in which the received electrical signal is in a condition to be digitized. Thus, the signal receivers 112a-d should introduce minimal distortion and signal delay of the received electrical signals. In particular, each of the signal receivers 112a-d includes an AC amplifier 502 that receives the one of the plurality of signals 109 from a corresponding transducer of the transducer array 110a-d. The AC amplifier 502 is configured to substantially block the DC component of the signal 109 and amplifies the signal 109 with a bandpass substantially centered at 40 KHz. The amplified signal is provided to an envelope detector 504 that detects the signal envelope and rectifies the signal forming a baseband signal. The detected baseband signal is then provided to a low pass filter 506 that converts the baseband signal into a single sine wave shaped pulse. As will be explained in more detail below, the peak of the single sine wave shaped pulse corresponds to the time of arrival at the associated transducer 110a-d relative to the other receivers. In one embodiment, the low pass filter 506 is a Chebyshev filter having a cutoff frequency of between 1000 to 2000 Hz. The design of a single pole or multi-pole Chebyshev filter, whether passive or active, is well known within the art and the actual design of the low pass filter 506 is dependent upon the system requirements including system and environmental noise levels, proximity of adjacent signals, power requirements, and other design criteria.

The envelope detector 504 may be of a coherent or incoherent design. Direct-detection receivers employ a square-law device that produces an electrical signal proportional to the intensity of the incident signal (e.g., an ultrasonic transducer)—the signal's power is measured directly. Since any phase information is lost in the process, direct detection cannot be used to measure the Doppler frequency shift of the signal, and direct detection is subject to other noise sources in the receiver and to background signals incident on the ultrasonic transducer receiver. Under certain conditions of limited signal strength, direct detection therefore offers sensitivity inferior to that of coherent detection. However, direct detection has advantages over coherent detection when either source temporal coherence or the spatial phase characteristics of the received signal cannot be strictly controlled, or when complexity or cost are important design issues.

Coherent detection first multiplies the incoming signal with a model of the expected signal and then integrates the product forming a correlation output function that provides accurate timing information using the peak of the integrated (correlation) signal. Since the pulse length is the same in all receivers, the peak should correspond to the time at which the pulse was received at the corresponding receiver. Coherent phase detection using a DSP chip has advantages over analog coherent detection in that the amplitude of the received signal can be normalized such that the peak of each signal can be more accurately determined using software.

Figure 6:
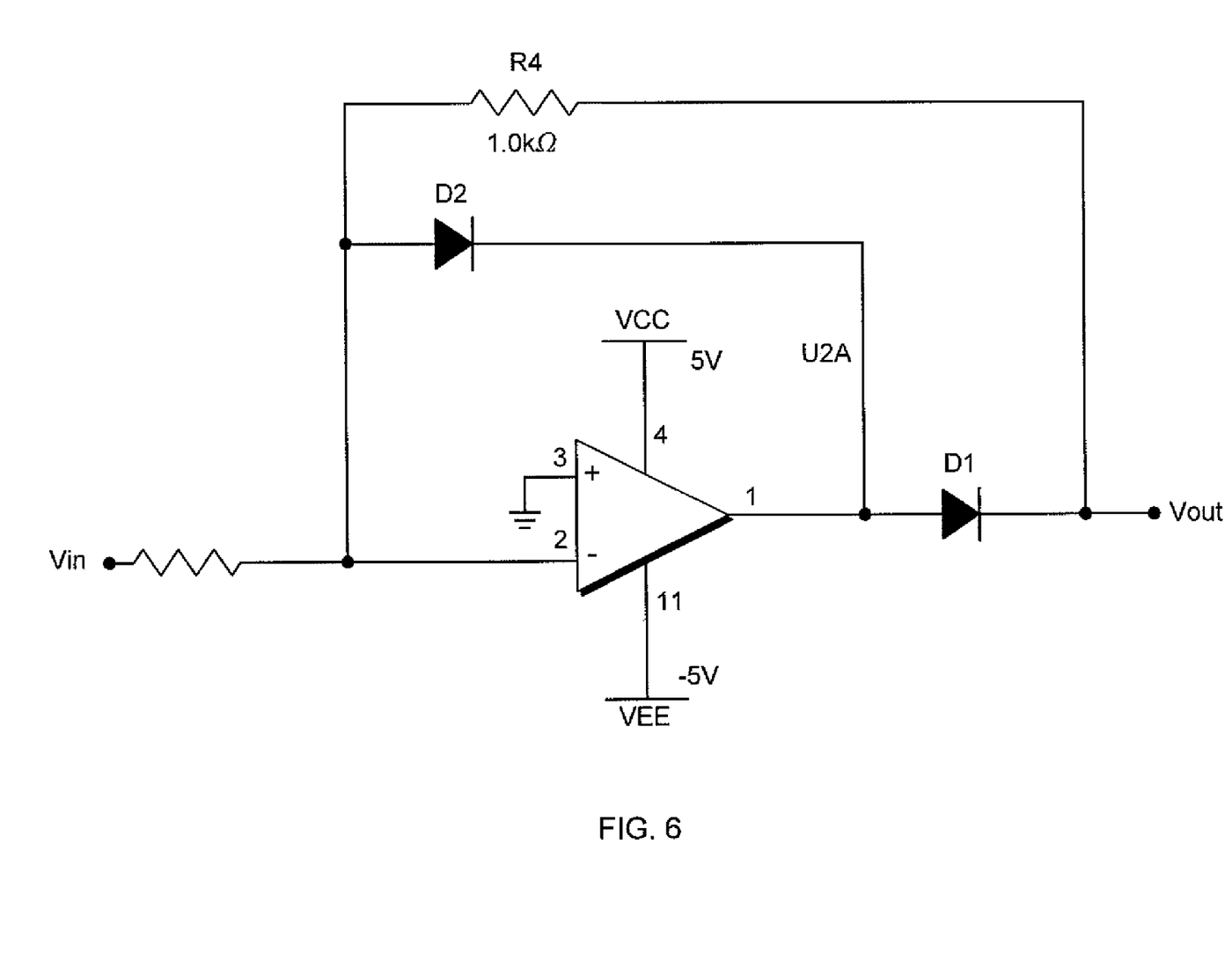
FIG. 6 is a schematic representation of a suitable precision rectifier suitable for use in the envelope detector provided for in FIG. 5.

In the apparatus described herein a direct detection, i.e., incoherent, system is used in the form of a precision rectifier depicted in FIG. 6. The diodes leave only the positive portion of the sinusoidal signal and the op-amp provides a gain of R3/R4 to reduce the forward voltage drop to nearly zero.

The power supply 501 may be provided by an external power supply, a battery power supply, or in the case of a computer interface 106 that is a USB interface, the necessary power may be supplied by the computer 108 via the computer interface 106 such as the well known USB interface.

Figure 7:
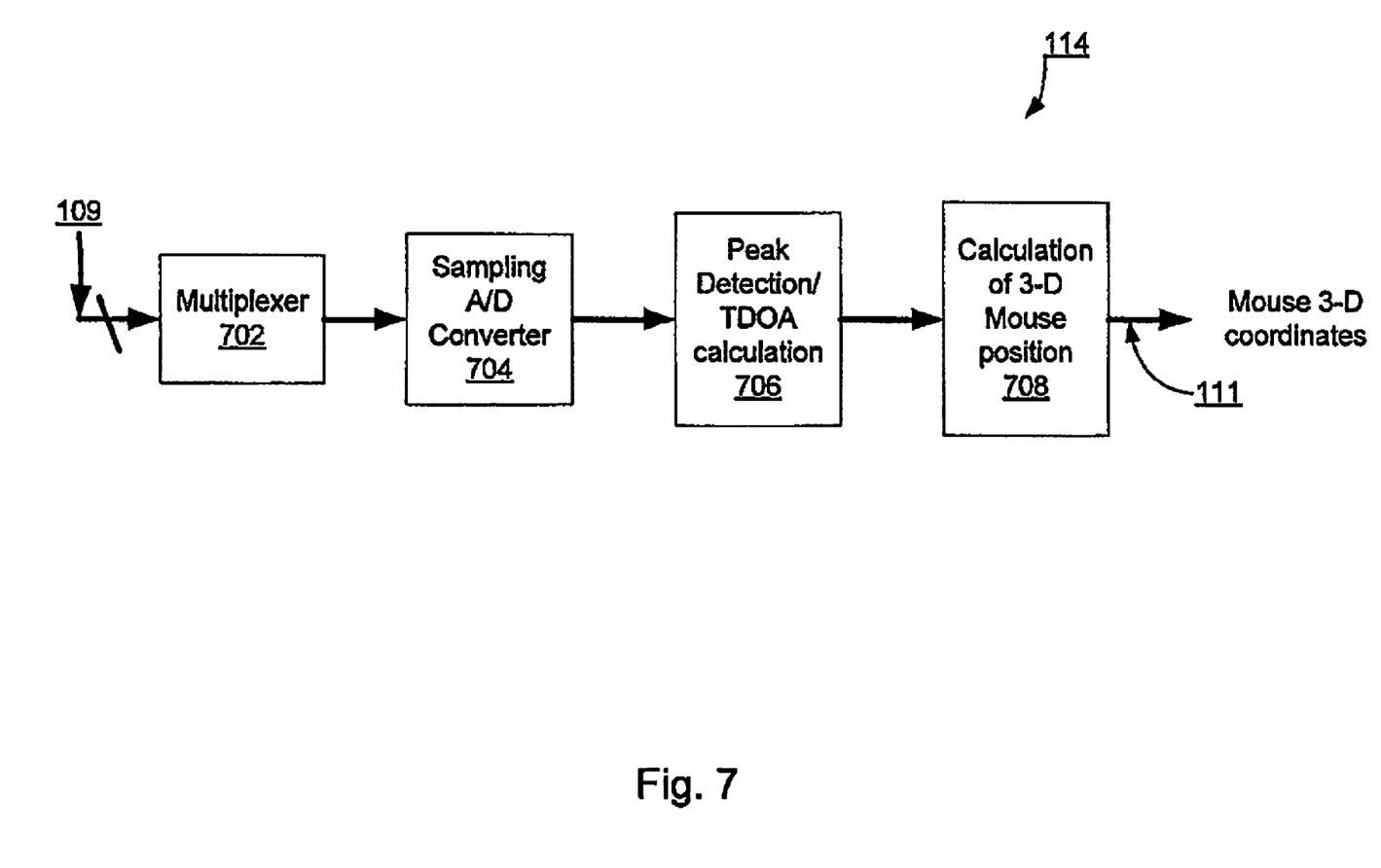
FIG. 7 is a block diagram of the digital signal processing block provided for in FIG. 1.

FIG. 7 depicts an embodiment of the DSP 114 of FIG. 1 that is responsible for the A-D conversion and calculations to determine the location of the transmitter in space. In particular, FIG. 7 depicts the DSP system 114 that is used to provide the main functionality of the system described herein. In one embodiment, the DSP system 114 should be able to provide an updated 3-dimensional location to the computer at least every 16 ms so that cursor movement appears smooth on a 60 Hz monitor. Obviously if the monitor was other than 60 Hz then the update time would be adjusted accordingly. In other embodiments, the updated 3-dimensional position may be updated sufficiently fast so that a user does not notice any appreciable delay by the computer. The DSP system uses the time that each of the receivers in the receiver array received the signal 103 from transmitter 102. The difference between these times, set relative to a reference receiver, typically set as the origin (0,0,0), must have a high resolution. The faster the various receivers are updated, the higher the time resolution will be with the concomitant improvement in spatial resolution as well.

The DSP 114 includes a multiplexer block 702, sampling block 704, peak detection/TDOA block 706, and position calculation block 708. As the various transducers 110a-d receive the signal 103 from transmitter 102, each of the plurality of transducer-signal receiver combinations provides a signal 109 to the DSP 114 that is an amplified and detected form of the signal 103 that was received at the particular transducer 110a-d. Thus the DSP 114 receives a signal 109 from every transducer-signal receiver combination, i.e., DSP 114 receives a plurality of signals 109 from the receiver 104. Because there is a single DSP and it can only convert one signal of the plurality of signals 109 at a time, each of the plurality of signals 109 must be individually selected and passed in a predetermined order, converted into a digital format, and used to calculate the position of the transmitter 102. Thus, the selected signal of the plurality of signals 109 is provided to the A/D converter 704 and converted into a digital representation of the selected signal of the plurality of signals 109. Thus, the multiplexer 702 is used to select an individual signal, pass the selected signal of the plurality of signals 109 to the sampling A/D converter 704. The A-D converter 704 converts the selected analog signal into a digital representation of the selected analog signal and provides the digitized version to the peak detection/TDOA block 706. As will be explained in more detail below, the peak detection/TDOA block 706 detects the time of the peak of the digitized representation of the selected signal and uses this time to form time of arrival (TOA) data for the corresponding one of the transducers 110a-d and ultimately to form the time difference of arrival (TDOA) data for the corresponding one of the transducers 110a-d relative to the reference transducer. When TDOA data for each of the transducers 110a-d has been determined, this set of TDOA data is then provided to position calculation block 708 that calculates the transmitter position and provides the set of 3-dimensional coordinates 111 to the computer interface 106.

Although the amplitude of the signal 103 received by each of the plurality of transducers 110a-d in the transducer array 110 will vary due to the physical parameters of the system itself; the signal 103 received by each of the transducers 110a-d will have a substantially similar waveform shape when compared to the signal 103 received at other transducers in the transducer array 110a-d. In general, due to the bandwidth limited nature of the transmitter and receiver ultrasonic transducers 206 (FIG. 2) and 112a-d (FIG. 1), respectively, the signal 103 when it is received by one of the transducers 110a-b will not have a sharp edge, but rather, will resemble a smooth curve. The time at which any signal 103 is received by a transducer 110a-d only varies with the time at which the peak of the particular signal is received. Thus, the time of the peak of the received signal can be used to determine the time of arrival of the signal at a particular transducer 110a-d. Once the time of arrival has been calculated for each the transducers 110a-d, the time of arrival at the reference transducer is subtracted from the time of arrival for every other receiver and the time difference of arrival (TDOA) can be ascertained.

Figure 8:
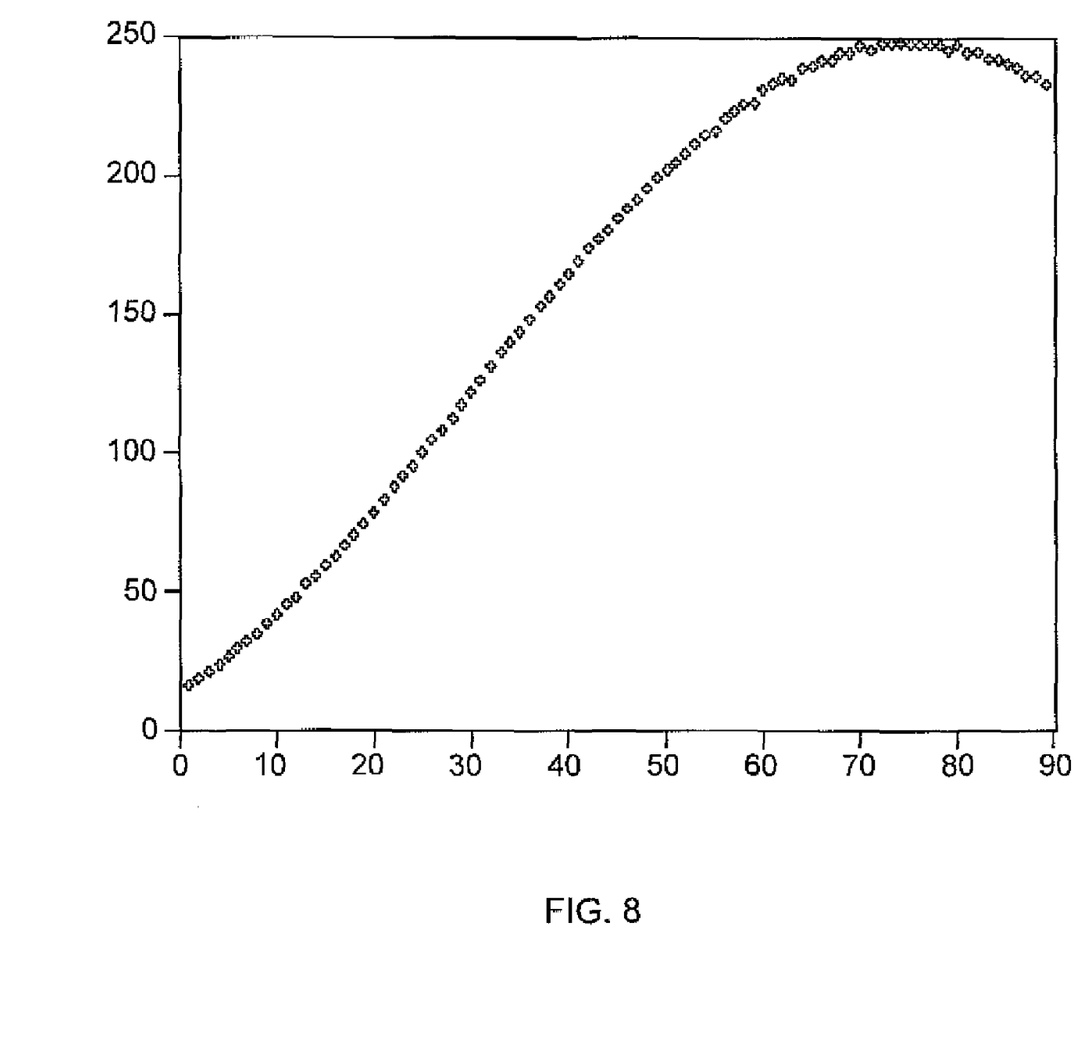
FIG. 8 is a schematic representation of a digital representation of a received signal after sampling and converting from an analog to digital format.

To determine the peak of the digitized representation of the received signal, the digitized representation of the received signal is compared to a stored high resolution representation of the received signal. Initially, the received signal is compared to a threshold value and the number of clock signals is counted and the variable Offset is then set to the number of clock values needed to exceed the threshold value and a flag is set, the value of the threshold is selected based on the system parameters and the signal to noise ratio desired. The flag controls whether the channel will be storing data. After the flag is set, the channel will store received signal data. The Offset value will be the initial sampling time. Once the flag has been set, the next 90 values of the received signal will be stored. Once 90 values have been stored, a flag will be set indicating that sampling for that channel has been completed. FIG. 8 depicts a received signal that has been sampled and stored.

Figure 9C:
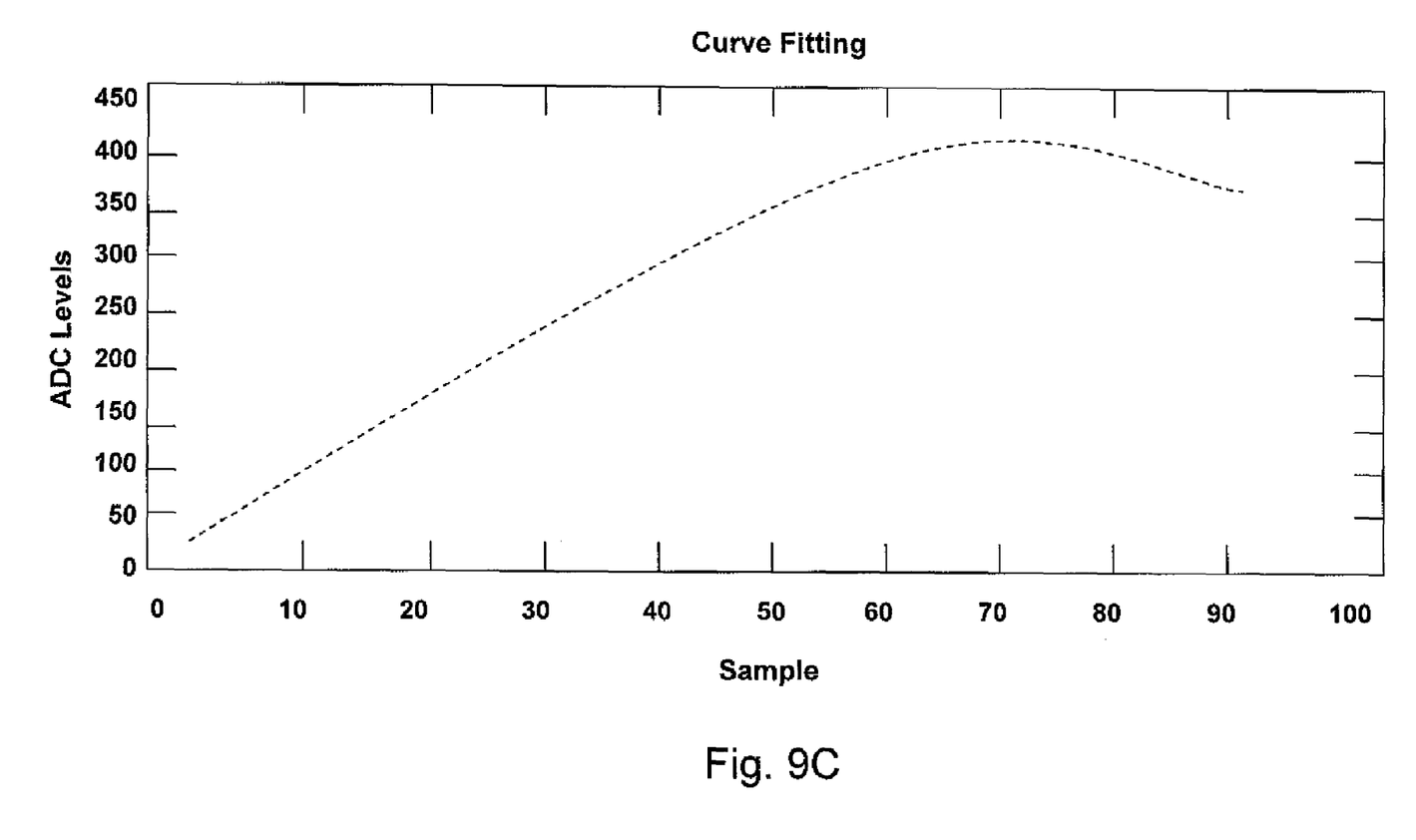
FIG. 9C is a graphic representation of a digital representation of the normalized and shifted received signal that minimizes the error function.

After all the channels have stored 90 samples each curve is normalized to the amplitude of the stored curve that each of the sampled signals will be compared to, see FIG. 9A. After normalizing each sampled signal, the signal is then shifted in time, see FIG. 9B and subtracted from the stored curve forming an error value. The sampled signal is shifted in time until the error is minimized and the amount of shift required is stored as a variable Shift, see FIG. 9C.

After shifting a sampled signal to minimize the error, the time value for the start of the sampled signal and the difference from that time to the peak is known. To determine the absolute peak time, i.e., the time difference from the start of the sampling to the time when the peak is reached, the Shift value is subtracted from the Offset value. This is value is the time of arrival for a single channel. As discussed above, one transducer is designated the reference transducer and the time of arrival of the reference transducer is subtracted from time of arrival for each of the other transducers 110a-d in order to determine the TDOA for each transducer.

Once all of the receiver TDOA have been determined, calculations using the TDOA data are performed to develop an estimate of the spatial location of the transmitter. In the following equations, c represents the speed of sound in air, the L, R, Q, W, and C are the initial coordinates of the transducers 110a-d in the transducers array, and x, y, and z are the coordinates of the transmitter. The following four equations relate the propagation time to the distance between each receiver and the transmitter:

$$T_L = \frac{1}{c}\sqrt{(x_L - x)^2 + (y_L - y)^2 + (z_L - z)^2}$$

$$T_R = \frac{1}{c}\sqrt{(x_R - x)^2 + (y_R - y)^2 + (z_R - z)^2}$$

$$T_Q = \frac{1}{c}\sqrt{(x_Q - x)^2 + (y_Q - y)^2 + (z_Q - z)^2}$$

$$T_C = \frac{1}{c}\sqrt{(x)^2 + (y)^2 + (z)^2}.$$

The following equations are used to calculate the TDOA between the receiver and each of the other receivers. By simultaneously solving these equations for x, y, and z the position of the transmitter may be determined:

$$\tau_L = T_L - T_C = \frac{1}{c}\sqrt{(x_L - x)^2 + (y_L - y)^2 + (z_L - z)^2} - \sqrt{x^2 + y^2 + z^2}$$

$$\tau_R = T_R - T_C = \frac{1}{c}\sqrt{(x_R - x)^2 + (y_R - y)^2 + (z_R - z)^2} - \sqrt{x^2 + y^2 + z^2}$$

$$\tau_Q = T_Q - T_C = \frac{1}{c}\sqrt{(x_Q - x)^2 + (y_Q - y)^2 + (z_Q - z)^2} - \sqrt{x^2 + y^2 + z^2}.$$

These equations may be solved using known numerical methods that may be programmed using a standard computer language such as C or C++ or may be solved using numerical analysis software such as MATLAB®.

The computer interface 106 is a programmable controller that communicates through the computer interface, typically a USB interface, to the computer. The microcontroller must also be able to communicate with the DSP chip as well. In one embodiment of the apparatus described herein, a PIC16C745 Microcontroller available from Microchip is a suitable 8-bit CMOS controller with USB support. Programming the microcontroller to communicate with the DSP chip and pass location and other mouse data to the computer would be known in the art and is dependent upon the system configuration. Other mouse data may include gestures that indicate right or left button clicks or movement of a track wheel.

The power supply for the transmitter should be small, lightweight, and unobtrusive. In one embodiment, the transmitter is disposed upon a user's finger with the transducer resting on top of the user's finger. In this configuration, the movement of the user's hand is sensed and transferred to the computer. Other embodiments are also considered. For example, the transmitter may be placed on a glove that is to be worn by the user or the transmitter may be placed on a moving object whose position needs to be monitored by a system. In the embodiment in which the transmitter is placed on the user's finger or on a glove worn by the user, the transmitter power supply must adaptable to such a configuration.

Lithium polymer batteries can be configured or molded to take nearly any shape. In one embodiment, the battery may be an ultra-thin lithium polymer power cell from PowerStream Electronics, 140 South Mountainway Dr., Orem, Utah 84058 that is 500 microns thick and has a capacity of 45 mAh. This battery may be shaped into a ring configuration that is sized and configured to slide onto and off of a user's finger. In this embodiment, the transmitter is disposed upon the battery on top of the user's finger.

It should be appreciated that other variations to and modifications of the above-described apparatus and method for finding the location of a transmitter in 3-dimensional space relative to a predetermined origin may be made without departing from the inventive concepts described herein. Accordingly, the invention should not be viewed as limited except by the scope and spirit of the appended claims.

What is claimed is:

1. An apparatus for determining the spatial position of a transmitter, the apparatus comprising:

a transmitter having a spatial position in 3-dimensional space, said transmitter operative to transmit a wireless signal having a predetermined waveform at a predetermined frequency, said transmitter being able to be moved in said 3-dimensional space;

a transducer array including a plurality of transducers, each of said plurality of transducers having a spatial location set in a 3-dimensional space and wherein one of said plurality of transducers being a reference transducer, each of said plurality of transducers being wirelessly coupled to said transmitter, each of said plurality of transducers operative to receive said wireless signal and to convert said received wireless signal into an electrical signal having a signal envelope;

a plurality of receivers each coupled to a corresponding one of said plurality of transducers and operative to receive said electrical signal therefrom, each of said receivers being operative to convert said electrical signal into a baseband signal and wherein said plurality of receivers provides a plurality of baseband signals as an output;

a digital signal processor coupled to said plurality of receivers and operative to receive said plurality of baseband signals therefrom, said digital signal processor operative to:

convert each of said plurality of baseband signal from an analog waveform representative of said corresponding baseband signal into a digital representation representative of said corresponding baseband signal;

use each of said plurality of digital representations to determine a plurality of time of arrival data each corresponding to the time of arrival of said wireless signal at each of said plurality of transducers;

determine a plurality of time difference of arrival data by subtracting each of said plurality of time of arrival data from said time of arrival data corresponding to said reference transducer; determine a set of 3-dimensional spatial coordinates of said transmitter as a function of said plurality of time difference of arrival data and said spatial location of each of said plurality of transducers.

2. The apparatus of claim 1 further comprising an interface coupled to said digital signal processor and operative to receive said set of 3-dimensional spatial coordinates therefrom and to convert said set of 3-dimensional spatial coordinates to a format suitable for interfacing to a computer.

3. The apparatus of claim 2 wherein said interface is a USB interface.

4. The apparatus of claim 1 wherein said transmitter includes a signal generator and a transducer.

5. The apparatus of claim 4 wherein said wireless signal is an ultrasonic signal and each of said plurality of transducers is an ultrasonic transducer.

6. The apparatus of claim 5 wherein said predetermined frequency of said wireless signal is substantially between 20 KHz and 60 KHz.

7. The apparatus of claim 4 wherein said wireless signal is a Radio Frequency signal and said transducer is a Radio Frequency IDentification (RFID) transducer.

8. The apparatus of claim 4 wherein said signal generator includes a programmable controller operative to generate said predetermined waveform and said predetermined frequency of said wireless signal.

9. The apparatus of claim 8 wherein said programmable controller is a digital signal processor.

10. The apparatus of claim 1 wherein said a plurality of transducers are configured in a predetermined spatial configuration.

11. The apparatus of claim 10 wherein said predetermined spatial configuration includes said reference transducer positioned at a predetermined 3-dimensional spatial location and the remaining of said plurality of transducers disposed in said predetermined spatial configuration and being spaced apart from said reference receiver in each dimension of the 3-dimensional space.

12. The apparatus of claim 10 wherein said plurality of transducers includes 4 or more transducers.

13. The apparatus of claim 10 wherein said plurality of transducers includes ultrasonic transducers.

14. The apparatus of claim 13 wherein said plurality of ultrasonic transducers are operative to receive an ultrasonic signal of substantially between 20 KHz and 60 KHz.

15. The apparatus of claim 10 wherein said plurality of transducers includes radio frequency receivers.

16. The apparatus of claim 15 wherein said plurality of radio frequency receivers are operative to receive a Radio Frequency IDentification signal.

17. The apparatus of claim 1 wherein each of said plurality of receivers includes an AC amplifier, an envelope detector, and a low pass filter.

18. The apparatus of claim 17 wherein said AC amplifier includes a center frequency substantially corresponding to said predetermined frequency of said wireless signal and substantially blocks DC signals.

19. The apparatus of claim 18 wherein said predetermined frequency is substantially 40 KHz and said AC amplifier includes a center frequency substantially equal to 40 KHz.

20. The apparatus of claim 17, wherein said envelope detector is an asynchronous envelope detector.

21. The apparatus of claim 20, wherein said asynchronous envelope detector is a square law detector.

22. The apparatus of claim 21, wherein said square law detector is a precision rectifier.

23. The apparatus of claim 17, wherein said envelope detector is a coherent detector.

24. The apparatus of claim 17 wherein each of said plurality of electrical signals provided by said plurality of transducers includes a pulse width, said low pass filter includes a cutoff frequency selected to provide a pulse width that is substantially smaller than other cutoff frequencies.

25. The apparatus of claim 17 wherein said low pass filter is a Chebyshev filter.

26. The apparatus of claim 25 wherein said Chebyshev filter has a cutoff frequency of substantially between 1000 Hz and 2000 Hz.

27. The apparatus of claim 1 further including a multiplexer having a plurality of inputs, each of said plurality of inputs being coupled to a corresponding output of one of said plurality of receivers, said multiplexer operative to receive said plurality of baseband signals from said plurality of receivers and to convert said plurality of baseband signals into a single signal stream and providing as an output said single signal stream; said apparatus further comprising an analog-to-digital converter having an input coupled to said multiplexer output and operative to convert said single signal stream into a serial digital data stream and to provide said serial digital data stream to said digital signal processor, wherein said digital signal processor being operative to store said serial digital data stream in a plurality of memory locations each corresponding to one of said plurality of transducers.

28. The apparatus of claim 1 wherein said digital signal further includes a normalization function operative to normalize said digital representation of said received baseband signal and associated envelope to a predetermined amplitude, an offset function to determine the start time of the received signal, a shift function to determine the elapsed time from the start time to the peak time of the received signal, wherein each of said plurality of time of arrival data is found by subtracting the start time corresponding to one of said plurality of transducers from the peak time corresponding to the same of said plurality of transducers.

29. The apparatus of claim 1 wherein said digital signal processor further comprising a subtraction function to subtract said time of arrival data of said reference receiver from each of said plurality of time of arrival data corresponding to each of the plurality of transducers and to provide as an output a plurality of time difference of arrival data each corresponding to one of said plurality of said transducers.

30. The apparatus of claim 1 wherein the digital signal processor determines the 3-dimensional coordinates corresponding to said 3-dimensional position in space of said transmitter by solving the following equations simultaneously;

$$\tau_L = T_L - T_C = \frac{1}{c}\sqrt{(x_L - x)^2 + (y_L - y)^2 + (z_L - z)^2} - \sqrt{x^2 + y^2 + z^2}$$

$$\tau_R = T_R - T_C = \frac{1}{c}\sqrt{(x_R - x)^2 + (y_R - y)^2 + (z_R - z)^2} - \sqrt{x^2 + y^2 + z^2}$$

$$\tau_Q = T_Q - T_C = \frac{1}{c}\sqrt{(x_Q - x)^2 + (y_Q - y)^2 + (z_Q - z)^2} - \sqrt{x^2 + y^2 + z^2}.$$

wherein c represents the speed of sound in air;
L, R, Q, are coordinates of said transducer for each of said plurality of receivers;
x, y, and z are coordinates of the transmitter; and
T is propagation time as it relates to distance between each of said receivers and said transmitter.

31. The apparatus of claim 1 said transmitter further including a battery having an outer surface, said batter being sized and configured to fit upon a user's finger.

32. The apparatus of claim 31 wherein said transmitter is disposed upon outer surface of said battery.

33. The apparatus of claim 1 further comprising an interface coupled to said digital signal processor and operative to receive said set of 3-dimensional spatial coordinates therefrom and to convert said set of 3-dimensional spatial coordinates to a format suitable for interfacing to a computer in real time, wherein said transmitter functions as a user interface device for said computer.

34. The apparatus of claim 33 wherein said user interface device is a mouse.

35. A method for determining the spatial position of a transmitter, the method comprising:
transmitting a wireless signal having a predetermined wave form and a predetermined frequency;
receiving said wireless signal at a plurality of receivers each including a transducer, signal receiver, and digital signal processor, wherein each of said plurality of receivers has a 3-dimensional spatial location, one of said plurality of receivers is designated as a reference receiver, and each 3-dimensional spatial location is spaced apart from said 3-dimensional spatial location of said reference receiver;
converting by each of said plurality of receivers said received wireless signal into a digital format;
determining the time of arrival of said wireless signal at each of said plurality of receivers;
determining the time difference of arrival at each of said plurality of receivers relative to said reference receiver and providing a plurality of time difference of arrival data; and determining a set of 3-dimensional coordinates of said transmitter as a function of said plurality time difference of arrival data and the 3-dimensional spatial location of each of said plurality of receivers.

36. The method of claim 35 wherein said step of determining each of said plurality of time of arrival data includes:
normalizing said received wireless signal corresponding to one of said plurality of receivers to a predetermined amplitude;
determining a start time of said received wireless signal received by said one of said plurality of said receivers;
determining a peak time of said received wireless signal received by said one of said plurality of said receivers;
subtracting said start time from said peak time to determine the time of arrival of said received wireless signal received by said one of said plurality of said receivers; and
providing as an output said plurality of time of arrival data.

37. The method of claim 35 wherein the step of normalizing said received signal includes multiplying said signal by a gain factor.

38. The method of claim 35 wherein the step of determining the start time includes comparing the received signal to a predetermined threshold and timing from a starting point to the time when said received signal exceeds said threshold.

39. The method of claim 35 wherein the step of determining the time difference of arrival at each of said plurality of receivers relative to said reference receiver includes subtracting the time of arrival of the reference receiver from said time of arrival of each of the remaining plurality of receivers.

40. The method of claim 35 wherein the step of determining the 3-dimensional coordinates includes solving simultaneously the following equations;

$$\tau_L = T_L - T_C = \frac{1}{c}\sqrt{(x_L-x)^2 + (y_L-y)^2 + (z_L-z)^2} - \sqrt{x^2+y^2+z^2}$$

$$\tau_R = T_R - T_C = \frac{1}{c}\sqrt{(x_R-x)^2 + (y_R-y)^2 + (z_R-z)^2} - \sqrt{x^2+y^2+z^2}$$

$$\tau_Q = T_Q - T_C = \frac{1}{c}\sqrt{(x_Q-x)^2 + (y_Q-y)^2 + (z_Q-z)^2} - \sqrt{x^2+y^2+z^2}$$

wherein c represents the speed of sound in air;

L, R, Q, are coordinates of said transducer for each of said plurality of receivers;

x, y and z are coordinates of the transmitter; and

T is propagation time as it relates to distance between each of said receivers and the transmitter.

41. The method of claim 35 wherein the step of transmitting a signal includes transmitting an ultrasonic signal.

42. The method of claim 41 wherein the step of transmitting an ultrasonic signal includes transmitting an ultrasonic signal having a frequency between 20 KHz and 60 KHz.

43. The method of claim 35 further including the step of providing said 3-dimensional coordinates corresponding to said 3-dimensional position in space of said transmitter to a computer in real time.

* * * * *

UNITED STATES PATENT AND TRADEMARK OFFICE
CERTIFICATE OF CORRECTION

| | | |
|---|---|---|
| PATENT NO. | : 7,668,046 B2 | Page 1 of 1 |
| APPLICATION NO. | : 12/134729 | |
| DATED | : February 23, 2010 | |
| INVENTOR(S) | : Christian Banker et al. | |

It is certified that error appears in the above-identified patent and that said Letters Patent is hereby corrected as shown below:

Under (76) Inventors: "Michael Cretella" should read -- Michael A. Cretella, Jr. --

In column 10, line 5 (claim 1) "baseband signal" should read -- baseband signals --

In column 12, line 17 (claim 31) "said batter being" should read -- said battery being --

Signed and Sealed this

Thirtieth Day of March, 2010

David J. Kappos
*Director of the United States Patent and Trademark Office*